(12) United States Patent
Cunningham et al.

(10) Patent No.: US 11,504,769 B2
(45) Date of Patent: Nov. 22, 2022

(54) CONTROLLED FIBER ORIENTATION IN ADDITIVE MANUFACTURED PARTS

(71) Applicant: GM Global Technology Operations LLC, Detroit, MI (US)

(72) Inventors: Andrew T. Cunningham, Royal Oak, MI (US); Ali Shabbir, Mississauga (CA); Zachary P. Steffes, West Bloomfield, MI (US); Paul J. Wolcott, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 486 days.

(21) Appl. No.: 16/796,244

(22) Filed: Feb. 20, 2020

(65) Prior Publication Data
US 2021/0260656 A1 Aug. 26, 2021

(51) Int. Cl.
| | | |
|---|---|---|
| B22F 10/00 | (2021.01) | |
| B22F 1/062 | (2022.01) | |
| C22C 47/14 | (2006.01) | |
| B22F 10/28 | (2021.01) | |
| B33Y 30/00 | (2015.01) | |
| B33Y 10/00 | (2015.01) | |
| B22F 10/10 | (2021.01) | |

(52) U.S. Cl.
CPC .............. *B22F 10/00* (2021.01); *B22F 1/062* (2022.01); *B22F 10/28* (2021.01); *C22C 47/14* (2013.01); *B22F 10/10* (2021.01); *B22F 2202/05* (2013.01); *B22F 2202/06* (2013.01); *B33Y 10/00* (2014.12); *B33Y 30/00* (2014.12)

(58) Field of Classification Search
CPC .......... B22F 10/00; B22F 1/062; B22F 10/28; B22F 10/10; B22F 2202/05; B22F 2202/06; B22F 10/14; B22F 10/25; B22F 12/55; C22C 47/14; C22C 47/04; B33Y 10/00; B33Y 30/00; B33Y 40/00; B33Y 70/10; Y02P 10/25; B29C 64/165; B29C 64/188; B29C 64/205; B29C 64/321
See application file for complete search history.

(56) References Cited

U.S. PATENT DOCUMENTS

| | | | | |
|---|---|---|---|---|
| 2013/0056672 A1* | 3/2013 | Johnston | ................. | B29C 70/88 252/62.51 R |
| 2014/0271966 A1* | 9/2014 | Giloh | .................... | B29C 64/393 425/166 |

\* cited by examiner

*Primary Examiner* — Rebecca Janssen
(74) *Attorney, Agent, or Firm* — Vivacqua Crane, PLLC

(57) ABSTRACT

A method of forming an additive manufactured component comprises depositing a first layer of build material on a build platform within an additive manufacturing machine, depositing reinforcement fibers into the first layer of build material, orienting the reinforcement fibers within the first layer of build material, lowering the build platform, depositing a second layer of build material on top of the first layer of build material, depositing reinforcement fibers into the second layer of build material, and orienting the reinforcement fibers within the second layer of build material.

14 Claims, 3 Drawing Sheets

CONTROLLED FIBER ORIENTATION IN ADDITIVE MANUFACTURED PARTS

INTRODUCTION

This disclosure relates generally to powder-bed additive manufacturing apparatus and methods. More particularly, this disclosure relates to a powder-bed additive manufacturing apparatus and methods for forming an additive manufactured part having fibers embedded therein and selectively orientating the fibers to control mechanical properties of the additive manufactured part.

Recently, additive manufacturing methods have emerged as alternatives to casting and machining methods. Additive manufacturing is also referred to as "layered manufacturing," "laser sintering," "reverse machining," and "3-D printing." Such terms are treated as synonyms for purposes of the present disclosure. On a basic level, additive manufacturing technologies are based on the concept of building up material in a cross-sectional layer-by-layer manner to form a 3D component. Common to additive manufacturing technologies is the use of a 3D modeling software (Computer Aided Design or CAD), machine equipment and layering material. Once a CAD sketch is produced, the machine equipment reads in data from the CAD file and uses successive layers of a desired material to fabricate the 3D component.

Unlike casting processes, additive manufacturing is not limited by the necessity to provide draft angles, avoid overhangs, etc. Additive manufacturing also simplifies and reduces the costs associated with metal alloy component manufacturing as compared to typical casting and machining methods.

Some specific additive manufacturing processes employ a powder bed fusion technique to fuse powder in additive steps to produce a component. For example, some additive manufacturing processes utilize a beam of energy to fuse a layer of powder in a powder bed in additive steps. Some examples of such powder bed additive manufacturing processes include direct metal laser sintering/fusion (DMLS)/(DMLF), selective laser sintering/fusion (SLS)/(SLF), and electron beam melting (EBM). In these processes, a layer of powder in the powder bed is fused to an underlying partially-formed component (or a seed component) to add a new layer to the component. A new layer of powder is deposited into the powder bed and over the previously formed layer of the partially-formed component, and the new layer of powder is similarly fused to the component. The depositing-and-fusing procedure is repeated a number of times to produce a plurality of layers on the partially-formed component to, ultimately, form the component.

Mixing short fibers with a polymer can help to create a composite part with enhanced material properties. Fiber reinforcement can lead to an increase in thermal conductivity, a decrease in thermal expansion, substantially reduced warping in larger prints, a reduction in residual stresses within the part, and an increase in the dimensional accuracy of printed parts. Further, fiber reinforcement can also substantially increase the strength and stiffness of additive manufactured parts, and increases thermal resistance or heat deflection temperature, thereby increasing the potential for end-use parts (beyond prototyping).

However, current methods of forming fiber reinforced additive manufactured parts is limited to the use of short fibers. Limitations related to how the fibers are inserted within the material prior to the additive manufacturing process and the additive manufacturing process itself limit the size of fibers within an additive manufactured part. Furthermore, current method of forming fiber reinforced additive manufactured parts provide limited ability to control the orientation of fibers embedded within the structure of an additive manufactured part.

Thus, while current additive manufacturing machines and methods achieve their intended purpose, there is a need for a new and improved system and method for forming an additive manufactured part that includes medium length reinforcement fibers embedded therein, wherein the orientation of such fibers can be selectively controlled to produce enhanced mechanical properties within the additive manufactured part.

SUMMARY

According to several aspects, of the present disclosure, a method of forming an additive manufactured component comprises depositing a first layer of build material on a build platform within an additive manufacturing machine, depositing reinforcement fibers into the first layer of build material, orienting the reinforcement fibers within the first layer of build material, lowering the build platform, depositing a second layer of build material on top of the first layer of build material, depositing reinforcement fibers into the second layer of build material, and orienting the reinforcement fibers within the second layer of build material.

According to another aspect, the first and second layers of build material have a layer thickness, and depositing reinforcement fibers into the first and second layers of build material further includes depositing reinforcement fibers having a length that is between approximately 0.1 times the layer thickness and approximately 2 times the layer thickness into the first and second layers of build material.

According to another aspect, depositing a first layer of build material on a build platform within an additive manufacturing machine further includes depositing a first layer of powder on a build platform within an additive manufacturing machine, the method further including forming a first layer of the additive manufactured component after orienting the reinforcement fibers within the first layer of powder, and depositing a second layer of build material on top of the first layer of build material further includes depositing a second layer of powder on top of the first layer of powder and the first layer of the additive manufactured component, the method further including forming a second layer of the additive manufactured component after orienting the reinforcement fibers within the second layer of powder.

According to another aspect, depositing reinforcement fibers into the first layer of powder further includes flocking reinforcement fibers into the first layer of powder in a desired shape, and depositing reinforcement fibers into the second layer of powder further includes flocking reinforcement fibers into the second layer of powder in a desired shape.

According to another aspect, flocking reinforcement fibers into the first layer of powder further includes projecting reinforcement fibers into the first layer of powder with one of gravity and electromagnetic charge, and flocking reinforcement fibers into the second layer of powder further includes projecting reinforcement fibers into the second layer of powder with one of gravity and electromagnetic charge.

According to another aspect, the method further includes controlling the orientation of the reinforcement fibers while the reinforcement fibers are being flocked into the first and second layers of powder with mechanical straighteners.

According to another aspect, depositing reinforcement fibers into the first layer of powder further includes depositing reinforcement fibers that are one of made from a ferromagnetic material and coated in a ferromagnetic material into the first layer of powder, and depositing reinforcement fibers into the second layer of powder further includes depositing reinforcement fibers that are one of made from a ferromagnetic material and coated in a ferromagnetic material into the second layer of powder.

According to another aspect, orienting the reinforcement fibers within the first layer of powder further includes selectively actuating an electromagnetic field to re-orient the reinforcement fibers within the first layer of powder, and orienting the reinforcement fibers within the second layer of powder further includes selectively actuating an electromagnetic field to re-orient the reinforcement fibers within the second layer of powder.

According to another aspect, selectively actuating an electromagnetic field to re-orient the reinforcement fibers within the first layer of powder further includes selectively tuning the electromagnetic field to precisely control the re-orientation of the reinforcement fibers within the first layer of powder, and selectively actuating an electromagnetic field to re-orient the reinforcement fibers within the second layer of powder further includes selectively tuning the electromagnetic field to precisely control the re-orientation of the reinforcement fibers within the second layer of powder.

According to another aspect, selectively actuating an electromagnetic field to re-orient the reinforcement fibers within the second layer of powder further includes pulling reinforcement fibers that are partially embedded within the first layer of the additive manufactured component upward into the second layer of powder.

According to another aspect, forming the first and second layers of the additive manufactured component includes forming the first and second layers of the additive manufactured component by one of powder bed fusion, binder jetting, material jetting, and directed energy deposition.

According to several aspects of the present disclosure, a method of forming an additive manufactured component comprises depositing a first layer of powder on a build platform within an additive manufacturing machine, flocking reinforcement fibers that are one of made from a ferromagnetic material and coated in a ferromagnetic material into the first layer of powder in a desired shape with one of gravity and electromagnetic charge, controlling the orientation of the reinforcement fibers while the reinforcement fibers are being flocked into the first layer of powder with mechanical straighteners, actuating an electromagnetic field to re-orient the reinforcement fibers within the first layer of powder, tuning the electromagnetic field to precisely control the re-orientation of the reinforcement fibers within the first layer of powder, forming a first layer of the additive manufactured component, lowering the build platform, depositing a second layer of powder on top of the first layer of powder and the first layer of the additive manufactured component, flocking reinforcement fibers that are one of made from a ferromagnetic material and coated in a ferromagnetic material into the second layer of powder in a desired shape with one of gravity and electromagnetic charge, controlling the orientation of the reinforcement fibers while the reinforcement fibers are being flocked into the second layer of powder with mechanical straighteners, actuating an electromagnetic field to re-orient the reinforcement fibers within the second layer of powder and to pull reinforcement fibers that are partially embedded within the first layer of the additive manufactured component upward into the second layer of powder, tuning the electromagnetic field to precisely control the re-orientation of the reinforcement fibers within the second layer of powder, and forming a second layer of the additive manufactured component.

According to another aspect, forming the first and second layers of the additive manufactured component includes forming the first and second layers of the additive manufactured component by one of powder bed fusion, binder jetting, material jetting, and directed energy deposition.

According to several aspects of the present disclosure, an additive manufacturing machine comprises a build platform adapted to support an additive manufactured component as the additive manufactured component is created, the build platform adapted to lower as successive layers of an additive manufactured component are formed, a bin for containing a volume of powder from which the additive manufactured component is to be formed, a re-coater adapted to push powder from the bin onto the build platform to deposit a layer of powder onto the build platform, a flocking unit adapted to deposit reinforcement fibers into a layer of powder on the build platform, an orientation unit adapted to re-orient reinforcement fibers that have been flocked into a layer of powder on the build platform, and a fusing mechanism adapted to fuse the powder in a desired shape to form a layer of the additive manufactured component from a layer of powder on the build platform.

According to another aspect, the flocking unit is adapted to deposit reinforcement fibers into a layer of powder in a desired shape.

According to another aspect, the flocking unit includes mechanical straighteners adapted to control the orientation of the reinforcement fibers while the reinforcement fibers are being deposited.

According to another aspect, the flocking unit is adapted to deposit reinforcement fibers that are one of made from a ferromagnetic material and coated in a ferromagnetic material, and the orientation unit is adapted to selectively create an electromagnetic field to re-orient the reinforcement fibers within a layer of powder, and to pull reinforcement fibers that are partially embedded within a previously formed adjacent layer of the additive manufactured component upward into a layer of powder deposited on top of the previously formed layer of the additive manufactured component, the electromagnetic field being tunable to precisely control the re-orientation and pulling of the reinforcement fibers.

According to another aspect, the fusing mechanism is adapted to selectively create a melt pool and fuse the powder into a desired shape, thereby forming a layer of the additive manufactured component.

According to another aspect, the fusing mechanism is adapted to create a melt pool and selectively fuse the powder into a desired shape by one of direct metal laser sintering (DMLS), electron beam melting (EBM), selective heat sintering (SHS), selective laser melting (SLM) and selective laser sintering (SLS).

According to another aspect, the fusing mechanism is adapted to deposit an adhesive on a layer of powder in a desired shape, thereby fusing the powder into a desired shape and forming a layer of the additive manufactured component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
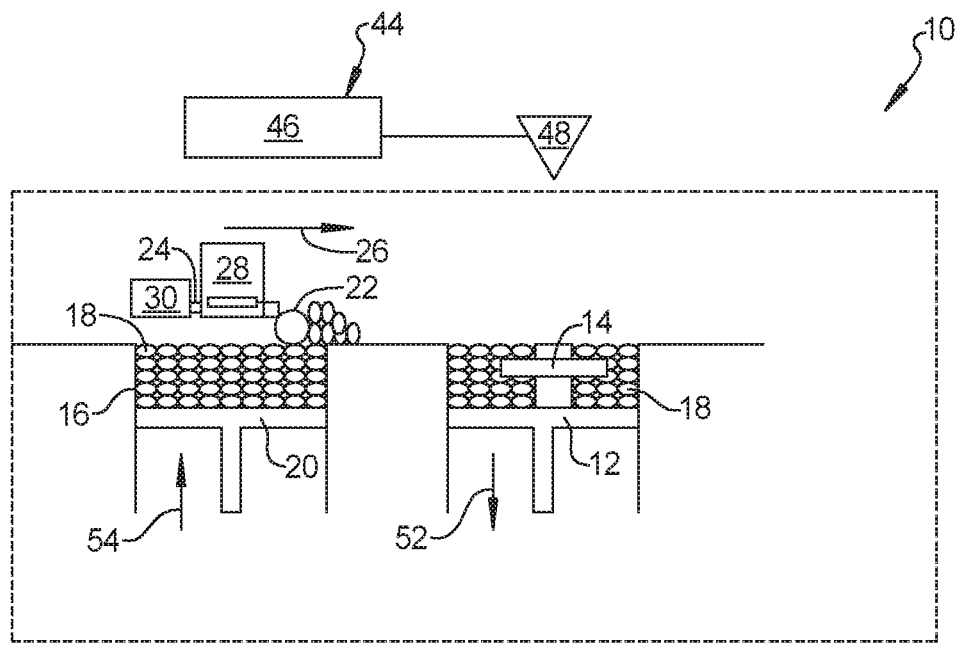
FIG. 1 is a schematic view of an additive manufacturing machine according to an exemplary embodiment.

Referring to FIG. 1, an additive manufacturing machine 10 in accordance with the present disclosure is shown. The additive manufacturing machine 10 includes a build platform 12 adapted to support an additive manufactured component 14 as the additive manufactured component 14 is created. The build platform 12 is able to be selectively raised and lowered vertically. As an additive manufactured component 14 is created, the build platform 12 lowers as successive layers of the additive manufactured component 14 are formed. A bin 16 positioned adjacent to the build platform 12 contains a volume of powder 18 from which the additive manufactured component 14 is to be formed. The bin 16 includes a bottom 20 that is able to be selectively raised and lowered vertically.

Figure 2:
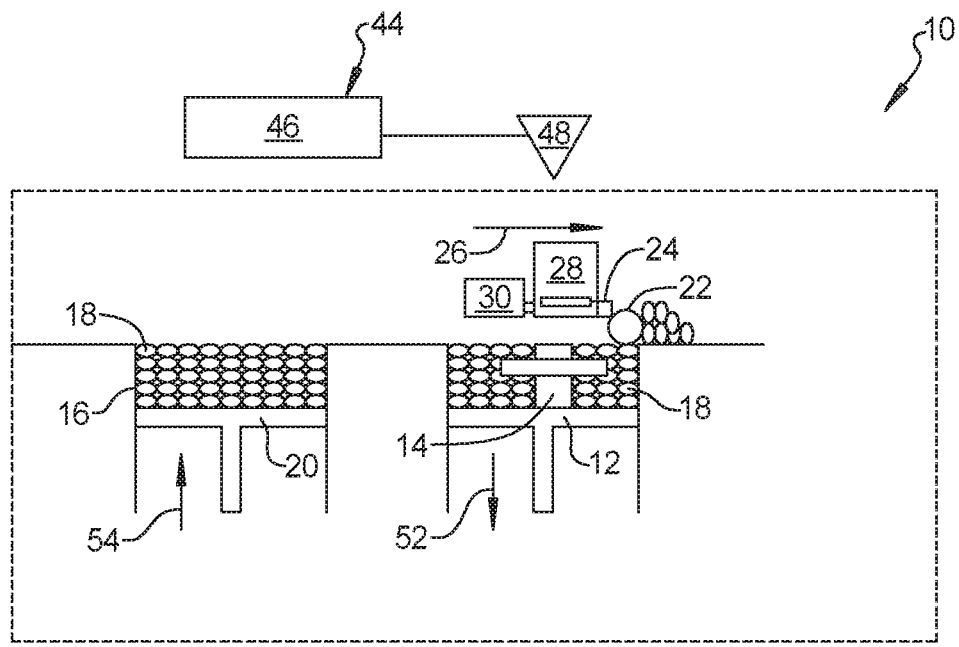
FIG. 2 is a schematic view of the additive manufacturing machine shown in FIG. 1, wherein a gantry is moved over a build platform of the additive manufacturing machine.

A re-coater 22 is adapted to push powder 18 from the bin 16 over onto the build platform 12 to deposit a layer of powder 18 onto the build platform 12, or on top of the additive manufactured component 14 being created. The re-coater 22 may be a roller or a blade and is mounted onto a gantry 24 that moves horizontally back and forth within the additive manufacturing machine 10. Referring to FIG. 1, the gantry 24 moves toward the build platform 12 as indicated by arrow 26. As the gantry 24 moves toward the build platform 12, the re-coater 22 pushes powder 18 off the top of the volume of powder 18 within the bin 16. Referring to FIG. 2, the gantry 24 continues moving toward the build platform 12 pushing the powder 18 over and creating a new layer of powder 18 on the build platform 12 or on top of the additive manufactured component 14 that is being created.

A flocking unit 28 and an orientation unit 30 are also mounted onto the gantry 24 and move within the additive manufacturing machine 10 along with the re-coater 22. The flocking unit 28 is positioned adjacent to the re-coater 22 and is adapted to deposit reinforcement fibers 32 into the layer of powder 18 that has been spread onto the build platform 12. In an exemplary embodiment, the flocking unit 28 is adapted to deposit reinforcement fibers 32 into the layer of powder 18 in a desired shape, such that the reinforcement fibers 32 are only deposited in the powder 18 that will be fused to create the additive manufactured component 14.

Figure 3:
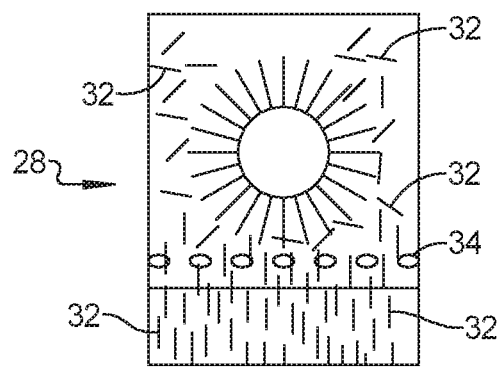
FIG. 3 is a schematic view of a flocking unit for an additive manufacturing machine according to an exemplary embodiment.

Referring to FIG. 3, in an exemplary embodiment, the flocking unit 28 drops the reinforcement fibers 32 and gravity forces the reinforcement fibers 32 into the layer of powder 18. The flocking unit 28 includes mechanical straighteners 34 that are adapted to control the orientation of the reinforcement fibers 32 while the reinforcement fibers 32 are being deposited. For example, the mechanical straighteners 34 may be adapted to ensure that the reinforcement fibers 32 are flocked vertically into the layer of powder 18 to improve the penetration of the reinforcement fibers 32 within the layer of powder 18, as shown in FIG. 3.

Figure 4:
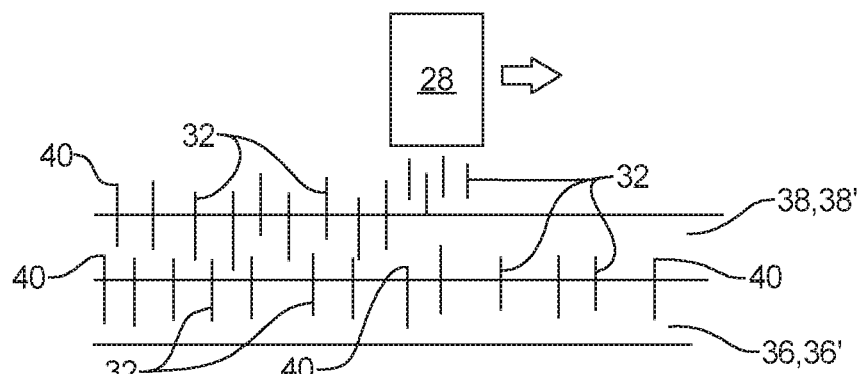
FIG. 4 is a schematic side view of first and second layers of powder and reinforcement fibers being vertically flocked into the powder.

Referring to FIG. 4, the mechanical straighteners 34 ensure the reinforcement fibers 32 are injected vertically into a layer of powder 18 leaving a free end 40 of the reinforcement fibers 32 exposed after the layer has been fused. Free ends 40 of the reinforcement fibers 32 within a first layer 36 of powder 18 that has been fused into a first layer 36' of the additive manufactured component 14 extend upward into a second layer 38 of un-fused powder 18 that is spread on top of the additive manufactured component 14. When the second layer 38 of powder 18 is fused into a second layer 38' of the additive manufactured component 14, the free ends 40 are encapsulated by the second layer 38', so the reinforcement fibers 32 extend between the layers 36', 38' of the additive manufactured component 14 giving added strength to the additive manufactured component 14.

Figure 5:
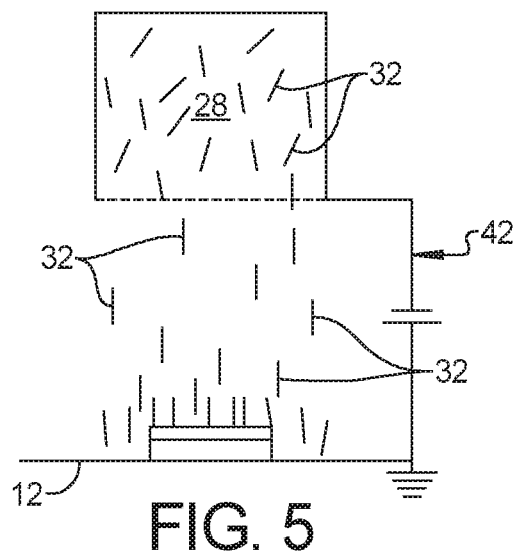
FIG. 5 is a schematic view of a flocking unit for an additive manufacturing machine according to another exemplary embodiment.

Referring to FIG. 5, in another exemplary embodiment, the flocking unit 28 includes a device 42 to create an electromagnetic charge and uses the electromagnetic charge to attract the reinforcement fibers 32 toward and pull the reinforcement fibers 32 into the layers of powder 18.

The orientation unit 30 is positioned adjacent the flocking unit 28 and is adapted to re-orient reinforcement fibers 32 that have been flocked into the layer of powder 18 on the build platform 12. In an exemplary embodiment, the reinforcement fibers 32 are either made from a ferromagnetic material, or the reinforcement fibers 32 are made from a non-ferromagnetic material and then coated in a ferromagnetic material. The orientation unit 30 is adapted to selectively create an electromagnetic field to re-orient the reinforcement fibers 32 that have been deposited in the layer of powder 18. Additionally, the orientation unit 30 will pull free ends 40 of reinforcement fibers that are partially embedded within a previously formed adjacent layer of the additive manufactured component 14 upward into the layer of fresh powder 18 that has been deposited on top of the previously formed layer of the additive manufactured component 14. This results in reinforcement extending between adjacent layers 36, 38 of the additive manufactured component 14, as shown in FIG. 4.

In another exemplary embodiment, the orientation machine 30 includes a controller adapted to selectively tune the electromagnetic field to precisely control the re-orientation and pulling of the reinforcement fibers 32. The controller is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

A fusing mechanism 44 is mounted within the additive manufacturing machine 10 and is adapted to fuse the powder 18 in a desired shape to form a layer of the additive manufactured component 14 from the layer of powder 18 that has been spread onto the build platform 12. In an exemplary embodiment, the fusing mechanism 44 is adapted to selectively create a melt pool and fuse the powder 18 into a desired shape, thereby forming a layer of the additive manufactured component 14.

The novel aspects of the present disclosure will work with many methods of creating additive manufactured components 14, such as direct metal laser sintering (DMLS), electron beam melting (EBM), selective heat sintering (SHS), selective laser melting (SLM) and selective laser sintering (SLS). In the exemplary embodiment shown in FIG. 1 and FIG. 2, the additive manufacturing machine 10 includes a laser 46 and a refractor 48 to direct a laser bean toward the build platform 12 to create a melt pool and fuse the powder 18 into a desired shape. In another exemplary embodiment, the fusing mechanism 44 is adapted to deposit an adhesive on the layer of powder 18 in a desired shape, thereby fusing the powder 18 into a desired shape and forming a layer of the additive manufactured component 14.

Figure 6:
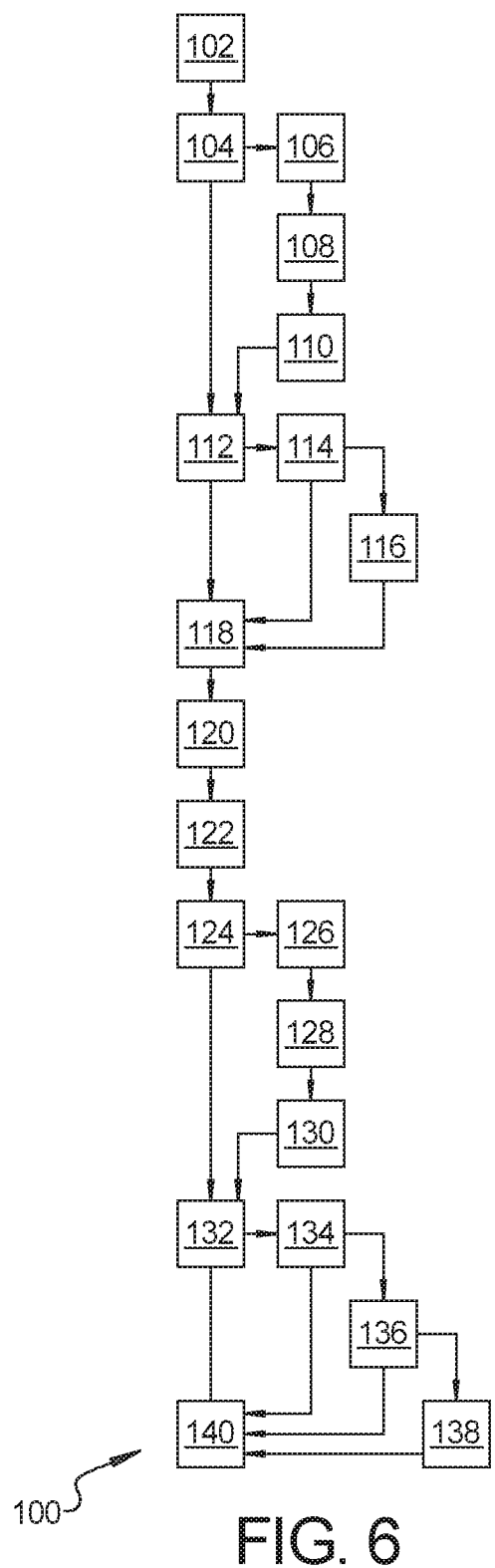
FIG. 6 is a flow chart illustrating a method of forming an additive manufactured component according to an exemplary embodiment.

Referring to FIG. 6, a method of forming an additive manufactured component 14 is shown at 100. Beginning at block 102, the method includes depositing a first layer 36 of build material on the build platform 12 within the additive manufacturing machine 10. In an exemplary embodiment, the additive manufacturing machine 10 is a powder bed fusion additive manufacturing machine 10 and the build material is powder 18. The gantry 24 moves from a position above the bin 16 of powder 18, as shown in FIG. 1 toward the build platform 12, as indicated by arrow 26. The re-coater 22 pushes powder 18 from the bin 16 over onto the build platform 12 to spread the first layer 36 of powder 18 onto the build platform 12.

Moving to block 104, the method further includes depositing reinforcement fibers 32 into the first layer 36 of build material (powder 18). In an exemplary embodiment, the first layer 36 of build material has a layer thickness 50, and the deposited reinforcement fibers 32 have a length that is between approximately 0.1 times the layer thickness 50 and approximately 2 times the layer thickness 50. Further, the reinforcement fibers 32 are either made from a ferromagnetic material, or made from a non-ferromagnetic material and then coated in a ferromagnetic material.

Moving to block 106, in an exemplary embodiment, depositing reinforcement fibers 32 into the first layer 36 includes flocking reinforcement fibers 36 into the first layer 36 of powder 18 in a desired shape, according to the shape of the additive manufactured component 14 being created. As the gantry 24 moves within the additive manufacturing machine 10, the flocking unit 28 follows the re-coater 22 and deposits the reinforcement fibers 32 into the first layer 36 of powder 18.

Moving to block 108, in another exemplary embodiment, flocking reinforcement fibers 32 into the first layer 36 of powder 18 further includes projecting reinforcement fibers 32 into the first layer 36 of powder 18 with one of gravity, as shown in FIG. 3, and electromagnetic charge, as shown in FIG. 5. Moving to block 110, the method includes controlling the orientation of the reinforcement fibers 32 while the reinforcement fibers 32 are being flocked into the first layer 36 of powder 18 with mechanical straighteners 34, as shown in FIG. 3.

Moving to block 112, after the reinforcement fibers 36 have been deposited into the first layer 36 of powder 18, the method includes orienting the reinforcement fibers 32 within the first layer 36. Moving to block 114, orienting the reinforcement fibers 32 includes selectively actuating an electromagnetic field to re-orient the reinforcement fibers 32 within the first layer 36 of powder 18. The orientation unit 30 is mounted onto the gantry 24, adjacent the flocking unit 28, and follows the flocking unit 28 over the first layer 36 of powder 18 as the gantry 24 moves across the build platform 12. The orientation unit 30 is actuated to create an electromagnetic field that acts on the reinforcement fibers 32 that have been deposited into the first layer 36 of powder 18. Since the reinforcement fibers 32 are either ferromagnetic or coated with a ferromagnetic material, the electromagnetic field will act on the reinforcement fibers 32 and, depending on the strength and orientation of the electromagnetic field, re-orient the reinforcement fibers 32 in a controllable and predictable manner.

Moving on to block 116, in an exemplary embodiment, the electromagnetic field generated by the orientation unit 30 is selectively tuned to precisely control the re-orientation of the reinforcement fibers 32 within the first layer 36 of powder 18. This allows the orientation of the reinforcement fibers 32 to be tailored for different applications and different product performance requirements.

Moving to block 118, the method includes forming a first layer 36' of the additive manufactured component 14 after orienting the reinforcement fibers 32 within the first layer 36 of powder 18. The first layer 36' of the additive manufactured component 14 is formed by fusing selected portions of the first layer 36 of powder 18 into a desired shape. By way of non-limiting examples, the powder 18 may be fused by one of powder bed fusion, binder jetting, material jetting, or directed energy deposition.

Moving to block 120, after the first layer 36' of the additive manufacturing component 14 has been formed, the build platform 12 is lowered, as shown by arrow 52. The gantry 24 moves back over the bin 16. After the gantry 24 and the re-coater 22 have moved back, the bottom 20 of the bin 16 is moved upward, as indicated by arrow 54, pushing the volume of powder 18 up. Moving to Block 122, a second layer 38 of build material (powder 18) is spread on top of the first layer 36' of the additive manufactured component 14.

Moving to block 124, the method further includes depositing reinforcement fibers 32 into the second layer 38 of powder 18. In an exemplary embodiment, the second layer 38 of powder 18 has a layer thickness 50, and the deposited reinforcement fibers 32 have a length that is between approximately 0.1 times the layer thickness 50 and approximately 2 times the layer thickness 50. Further, the reinforcement fibers 32 are either made from a ferromagnetic material, or made from a non-ferromagnetic material and then coated in a ferromagnetic material.

Moving to block 126, in an exemplary embodiment, depositing reinforcement fibers 32 into the second layer 38 includes flocking reinforcement fibers 32 into the second layer 38 of powder 18 in a desired shape, according to the shape of the additive manufactured component 14 being created. As the gantry 24 moves within the additive manufacturing machine 10, the flocking unit 28 follows the re-coater 22 and deposits the reinforcement fibers 32 into the second layer 38 of powder 18. Moving to block 128, in another exemplary embodiment, flocking reinforcement fibers 32 into the second layer 38 of powder 18 further includes projecting reinforcement fibers 32 into the second layer 38 of powder 18 with one of gravity, as shown in FIG. 3, and electromagnetic charge, as shown in FIG. 5. Moving to block 130, the method includes controlling the orientation of the reinforcement fibers 32 while the reinforcement fibers 32 are being flocked into the second layer 38 of powder with mechanical straighteners 34, as shown in FIG. 3.

Moving to block 132, after the reinforcement fibers 32 have been deposited into the second layer 38 of powder 18, the method includes orienting the reinforcement fibers 32 within the second layer 38. Moving to block 134, orienting the reinforcement fibers 32 includes selectively actuating an electromagnetic field to re-orient the reinforcement fibers 32 within the second layer 38 of powder 18. The orientation unit 30 is mounted onto the gantry 24, adjacent the flocking unit 28, and follows the flocking unit 28 over the second layer 38 of powder 18 as the gantry 24 moves across the build platform 12. The orientation unit 30 is actuated to create an electromagnetic field that acts on the reinforcement fibers 32 that have been deposited into the second layer 38 of powder 18. Since the reinforcement fibers 32 are either ferromagnetic or coated with a ferromagnetic material, the electromagnetic field will act on the reinforcement fibers 32 and, depending on the strength and orientation of the electromagnetic field, re-orient the reinforcement fibers 32 in a controllable and predictable manner.

Moving on to block 136, in an exemplary embodiment, the electromagnetic field generated by the orientation unit 30 is selectively tuned to precisely control the re-orientation of the reinforcement fibers 32 within the second layer 38 of powder 18. This allows the orientation of the reinforcement fibers to be tailored for different applications and different product performance requirements.

Moving to block 138, in an exemplary embodiment, selectively actuating an electromagnetic field to re-orient the reinforcement fibers 32 within the second layer 38 of powder 18 further includes pulling free ends 40 of reinforcement fibers 32 that are partially embedded within the first layer 36' of the additive manufactured component 14 upward into the second layer 38 of powder 18. This will ensure that some of the reinforcement fibers 32 extend across and between both the first and second layers 36', 38' of the additive manufactured component 14, adding strength to the additive manufactured component 14.

Moving to block 140, the method includes forming a second layer 38' of the additive manufactured component 14 after orienting the reinforcement fibers 32 within the second layer 38 of powder 18. The second layer 38' of the additive manufactured component 14 is formed by fusing selected portions of the second layer 38 of powder 18 into a desired shape. By way of non-limiting examples, the powder 18 may be fused by one of powder bed fusion, binder jetting, material jetting, or directed energy deposition.

The additive manufactured component is created by continuing to repeat the steps discussed above, creating successive layers until the additive manufactured component is complete.

An additive manufacturing machine 10 and method according to the present disclosure offers several advantages. These include the ability to control and reorient reinforcement fiber 32 direction to optimize isotropy and interlayer strength.

Further, this additive manufacturing machine 10 and method allows longer reinforcement fibers 32 to be utilized for improved mechanical properties without the current drawback of increased anisotropy. Known methods can only achieve optimized isotropy and interlayer strength equal to that achieved by the method of the present disclosure using shorter length reinforcement fibers 32. Known methods using longer reinforcement fibers 32 have greatly varying properties in the vertical direction and even flat on the build platform 12.

The additive manufacturing machine 10 and method of the present disclosure allows reinforcement fiber 32 orientation to no longer be solely determined by the direction of the re-coater 22 as the re-coater 22 flattens and drags the reinforcement fibers 32 in the direction of travel, when the reinforcement fibers 32 are dispersed throughout the volume of powder 18 ahead of time, resulting in high anisotropy.

The additive manufacturing machine 10 and method of the present disclosure is equipped with a flocking unit 28, allowing precise angular positioning of the embedded reinforcement fibers 32, and insertion of reinforcement fibers 32 into the entire layer of powder 18, or in localized regions only. Recyclability and material cost are improved by selectively inserting reinforcement fibers 32 only where the powder fusing (additive manufacture component cross-section) will occur. Un-fused powder 18 can be collected after the additive manufactured component 14 is complete and is not contaminated by reinforcement fibers 32, and can be easily re-used.

The additive manufacturing machine 10 and method of the present disclosure uses electromagnetism to direct and impart reinforcement fibers 32 into the powder 18. Reinforcement fibers 32 can either be encapsulated in a ferromagnetic coating or ferromagnetic themselves. Additionally, the electromagnetic field is tunable to precisely control reinforcement fiber 32 position. For example, the magnetic force can be tuned to allow reinforcement fibers 32 to reorient in the vertical direction, pulling free ends 40 above the surface of the layer of powder 18, or tuned to allow reinforcement fibers 32 to reorient in the vertical direction, without breaching the surface of the layer of powder 18. The method of the present disclosure allows reinforcement fibers 32 already embedded in the powder 18 to be reoriented in any direction (i.e. vertically) or pattern (i.e. radially).

In addition, magnetic reinforcement fibers 32 can be used to control the isotropy of the reinforcement fibers 32 within the finished additive manufactured component 14, and allow the additive manufactured component 14 itself to become magnetic.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An additive manufacturing machine, comprising:
   a build platform adapted to support an additive manufactured component as the additive manufactured component is created, the build platform adapted to lower as successive layers of an additive manufactured component are formed;
   a bin for containing a volume of powder from which the additive manufactured component is to be formed;
   a re-coater adapted to push powder from the bin onto the build platform to deposit a layer of powder onto the build platform;

a flocking unit adapted to deposit reinforcement fibers into a layer of powder on the build platform, the flocking unit including mechanical straighteners adapted to control the orientation of the reinforcement fibers while the reinforcement fibers are being deposited;

an orientation unit adapted to re-orient reinforcement fibers that have been flocked into a layer of powder on the build platform; and a fusing mechanism adapted to fuse the powder in a desired shape to form a layer of the additive manufactured component from a layer of powder on the build platform.

2. The additive manufacturing machine of claim 1, wherein the flocking unit is adapted to deposit reinforcement fibers into a layer of powder in a desired shape.

3. The additive manufacturing machine of claim 1, wherein the flocking unit is adapted to deposit reinforcement fibers that are one of made from a ferromagnetic material and coated in a ferromagnetic material, and the orientation unit is adapted to selectively create an electromagnetic field to re-orient the reinforcement fibers within a layer of powder, and to pull reinforcement fibers that are partially embedded within a previously formed adjacent layer of the additive manufactured component upward into a layer of powder deposited on top of the previously formed layer of the additive manufactured component, the electromagnetic field being tunable to precisely control the re-orientation and pulling of the reinforcement fibers.

4. The additive manufacturing machine of claim 1, wherein the fusing mechanism is adapted to selectively create a melt pool and fuse the powder into a desired shape, thereby forming a layer of the additive manufactured component.

5. The additive manufacturing machine of claim 4, wherein the fusing mechanism is adapted to create a melt pool and selectively fuse the powder into a desired shape by one of direct metal laser sintering (DMLS), electron beam melting (EBM), selective heat sintering (SHS), selective laser melting (SLM) and selective laser sintering (SLS).

6. The additive manufacturing machine of claim 1, wherein the fusing mechanism is adapted to deposit an adhesive on a layer of powder in a desired shape, thereby fusing the powder into a desired shape and forming a layer of the additive manufactured component.

7. The additive manufacturing machine of claim 2, wherein the flocking unit is adapted to deposit reinforcement fibers with one of gravity and electromagnetic charge.

8. A method of forming an additive manufactured component, comprising:
depositing, with a re-coater adapted to push powder onto a build platform from a bin for containing a volume of powder from which the additive manufactured component is to be formed, a first layer of powder on the build platform within an additive manufacturing machine, the build platform adapted to support an additive manufactured component as the additive manufactured component is created and to lower as successive layers of an additive manufactured component are formed;
flocking, with a flocking unit adapted to deposit reinforcement fibers into a layer of powder on the build platform and including mechanical straighteners adapted to control the orientation of the reinforcement fibers while the reinforcement fibers are being deposited, reinforcement fibers into the first layer of powder in a desired shape;
controlling, with the mechanical straighteners, the orientation of the reinforcement fibers while the reinforcement fibers are being flocked into the first layer of powder with mechanical straighteners;
re-orienting, with an orientation unit adapted to re-orient reinforcement fibers that have been flocked into a layer of powder on the build platform, the reinforcement fibers within the first layer of powder;
forming, with a fusing mechanism adapted to fuse the powder in a desired shape, a first layer of the additive manufactured component;
lowering the build platform;
depositing, with the re-coater, a second layer of powder, from the bin, on top of the first layer of powder and the first layer of the additive manufactured component;
flocking, with the flocking unit, reinforcement fibers into the second layer of powder in a desired shape;
controlling, with the mechanical straighteners, the orientation of the reinforcement fibers while the reinforcement fibers are being flocked into the second layer of powder with mechanical straighteners;
re-orienting, with the orientation unit, the reinforcement fibers within the second layer of powder; and
forming, with the fusing mechanism, a second layer of the additive manufactured component.

9. The method of claim 8, wherein forming, with the fusing mechanism, the first and second layers of the additive manufactured component includes creating, with the fusing mechanism, for each of the first and second layers of the additive manufactured component, a melt pool and selectively fusing the powder into a desired shape by one of direct metal laser sintering (DMLS), electron beam melting (EBM), selective heat sintering (SHS), selective laser melting (SLM) and selective laser sintering (SLS).

10. The method of claim 8, wherein
flocking, with the flocking unit, reinforcement fibers into the first layer of powder further includes flocking, with the flocking unit, reinforcement fibers into the first layer of powder with one of gravity and electromagnetic charge, and flocking, with the flocking unit, reinforcement fibers into the second layer of powder further includes flocking, with the flocking unit, reinforcement fibers into the second layer of powder with one of gravity and electromagnetic charge.

11. The method of claim 10, wherein flocking, with the flocking unit, reinforcement fibers into the first layer of powder further includes flocking, with the flocking unit, reinforcement fibers that are one of made from a ferromagnetic material and coated in a ferromagnetic material into the first layer of powder, and flocking, with the flocking unit, reinforcement fibers into the second layer of powder further includes flocking, with the flocking unit, reinforcement fibers that are one of made from a ferromagnetic material and coated in a ferromagnetic material into the second layer of powder.

12. The method of claim 11, wherein ee-orienting, with the orientation unit, the reinforcement fibers within the first layer of powder further includes selectively actuating, with the orientation unit, an electromagnetic field to re-orient the reinforcement fibers within the first layer of powder, and re-orienting, with the orientation unit, the reinforcement fibers within the second layer of powder further includes selectively actuating, with the orientation unit, an electromagnetic field to re-orient the reinforcement fibers within the second layer of powder.

13. The method of claim 12, wherein selectively actuating, with the orientation unit, an electromagnetic field to re-orient the reinforcement fibers within the first layer of powder further includes selectively tuning the electromagnetic field to precisely control the re-orientation of the reinforcement fibers within the first layer of powder, and selectively actuating, with the orientation uni, an electromagnetic field to re-orient the reinforcement fibers within the second layer of powder further includes selectively tuning the electromagnetic field to precisely control the re-orientation of the reinforcement fibers within the second layer of powder.

14. The method of claim 12, wherein selectively actuating, with the orientation unit, an electromagnetic field to re-orient the reinforcement fibers within the second layer of powder further includes pulling reinforcement fibers that are partially embedded within the first layer of the additive manufactured component upward into the second layer of powder.

\* \* \* \* \*